United States Patent [19]

Strohl et al.

[11] Patent Number: 4,573,665

[45] Date of Patent: Mar. 4, 1986

[54] SELF-CONTAINED EXOTHERMIC CUTTING SYSTEM

[75] Inventors: Robert L. Strohl, Lancaster; Paul E. Moore, Glouster; Alexander Toth, Lancaster, all of Ohio

[73] Assignee: Arcair Company, Lancaster, Ohio

[21] Appl. No.: 677,458

[22] Filed: Dec. 3, 1984

[51] Int. Cl.[4] .............................................. B23K 7/00
[52] U.S. Cl. .................................... 266/48; 219/383; 239/286; 431/128
[58] Field of Search ......................... 266/48; 431/128; 239/286; 219/383

[56] References Cited

U.S. PATENT DOCUMENTS

| | | | |
|---|---|---|---|
| 1,244,030 | 10/1917 | Cave | 239/286 |
| 1,915,446 | 6/1933 | Pressler | 431/128 |
| 4,391,209 | 7/1983 | Moore | 110/349 |
| 4,437,649 | 3/1984 | Rieppel et al. | 266/48 |

Primary Examiner—Wayland Stallard
Attorney, Agent, or Firm—James C. Simmons; E. Eugene Innis

[57] ABSTRACT

A self-contained portable exothermic cutting system including an electrode holder, current source, arc initiator and source of oxygen.

5 Claims, 4 Drawing Figures

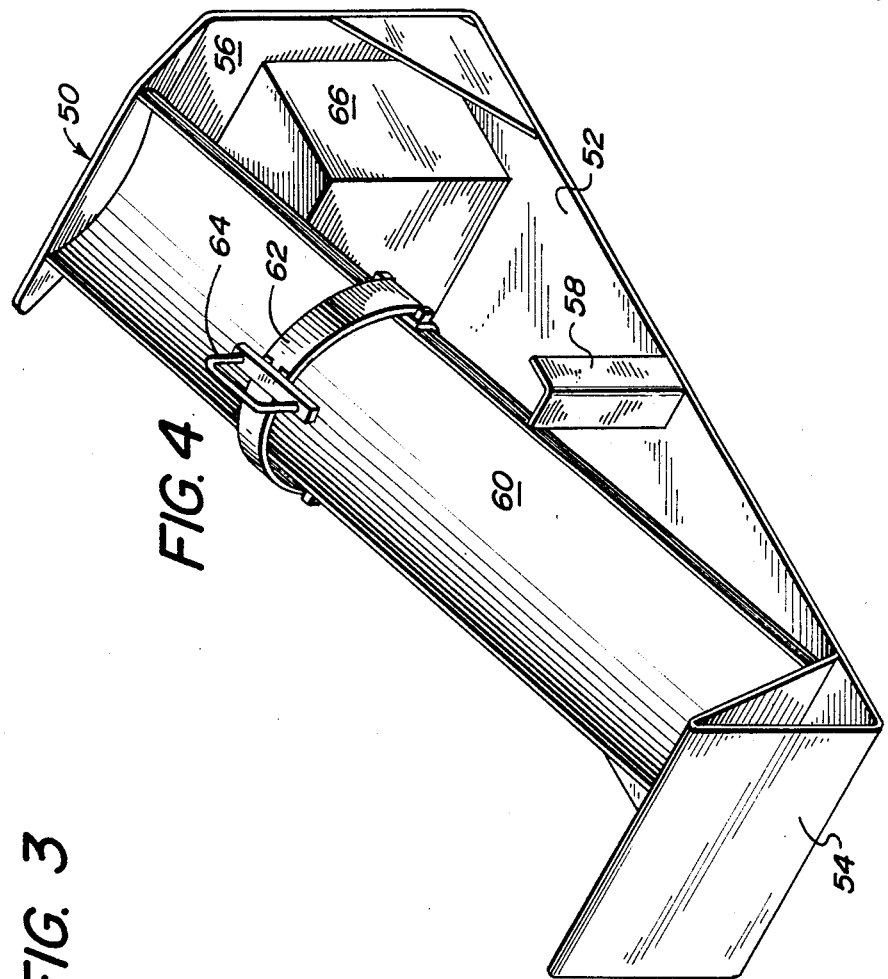
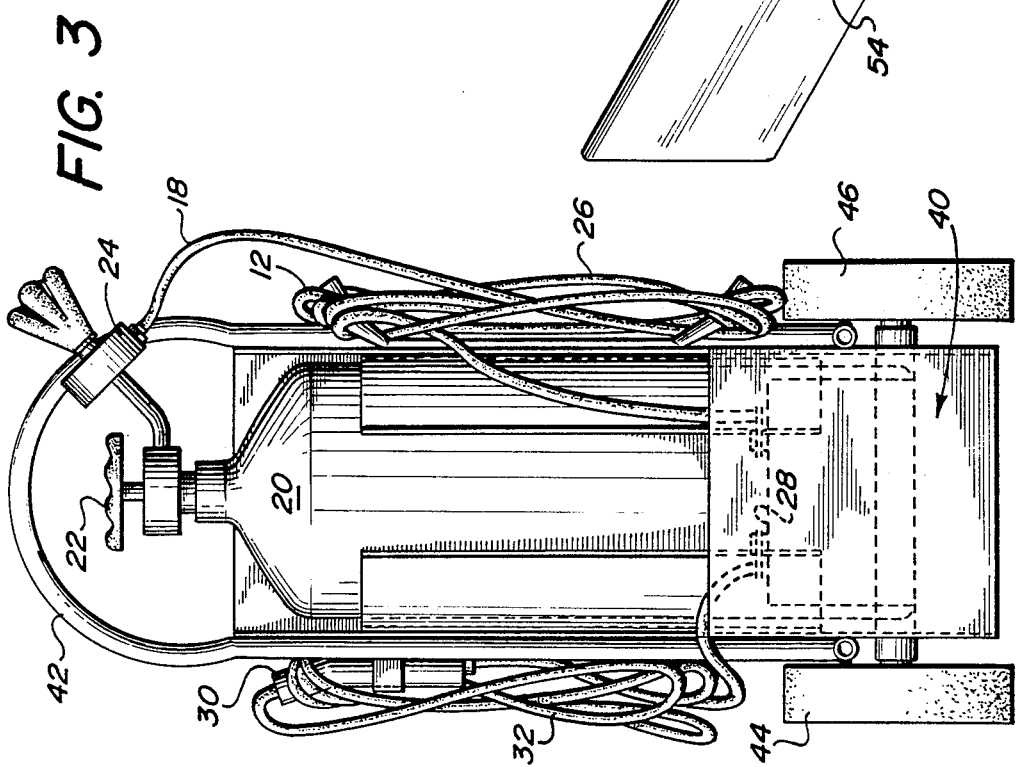

SELF-CONTAINED EXOTHERMIC CUTTING SYSTEM

TECHNICAL FIELD

This invention pertains to exothermic cutting using an electrode or burning bar of the type wherein a mass of metal is ignited in the presence of an oxidizing gas (e.g. oxygen) to form a flame or products of combustion which can be directed at a structural shape for cutting or piercing of the structural shape. In particular the invention relates to a lightweight portable self-contained system that can be used by such diverse parties as emergency rescue squads and metal reclaimers.

BACKGROUND OF THE PRIOR ART

Conventional buring bars which are used on land are generally made from large diameter pipe or tubing which is used to contain a plurality of elongated rods or wires to make up a mass of oxidizable metal. Oxygen is conducted down the tube to the end of the rod where combustion is initiated to produce a flame which is directed at a structural material, e.g. concrete, for cutting or piercing. The prior art is adequately described in U.S. Pat. Nos. 4,391,209 and 4,437,649, the specifications of which are incorporated herein by reference.

For example, such conventional burning bars because of the size and volume of products of combustion could not be used to extricate a person from a wrecked automobile. In order to do so most emergency rescue units carry either an oxy-fuel cutting outfit or a mechanical device such as the "Jaws of Life".

If an emergency rescue operation uses an oxy-fuel set up, then they must carry both oxygen and a fuel such as acetylene. This has all the problems of fuel near a fire as well as the cumbersomeness of handling large cylinders and the attendent problems that such cylinders create.

The mechanical devices such as the "Jaws of Life" require a period of time to set up before they can be used. It is well known that in certain emergency situations time is of the essence, especially if the victim is seriously injured and trapped inside of a wrecked automobile.

BRIEF SUMMARY OF THE INVENTION

The present invention relates to a lightweight portable exothermic cutting system which can be ready for use in a short period of time in emergency situations. The system includes a torch adapted to hold an exothermic electrode and conduct electricity to the electrode, a means to initiate an arc between the electrode and another conductor, a source of electrical current and a source of oxygen combined so that the system can be ready for use at a moments notice.

BRIEF DESCRIPTION OF THE DRAWING

FIG. 3 is a front elevational view of the system of FIG. 2.

FIG. 4 is a perspective view of another support for a system according to the present invention.

Referring to FIG. 1, the basic system 10 includes an exothermic torch 12 adapted to hold an exothermic electrode 14. Torch 10 can be of any type that will permit gripping of an electrode 14 and fastening of the electrode to the torch 12 such as by a collet nut 16. One such torch is shown in U.S. Patent Application No. 636,524 filed Aug. 1, 1984 relating to a design for a "Torch For Exothermic Cutting Electrodes". The electrode 14 can be of the type shown in U.S. Pat. Nos. 4,391,209 or 4,437,649 or that shown and described in U.S. Patent Application Ser. No. 662,207 filed Oct. 18, 1984 for a "Coated Exothermic Electrode".

Figure 1:
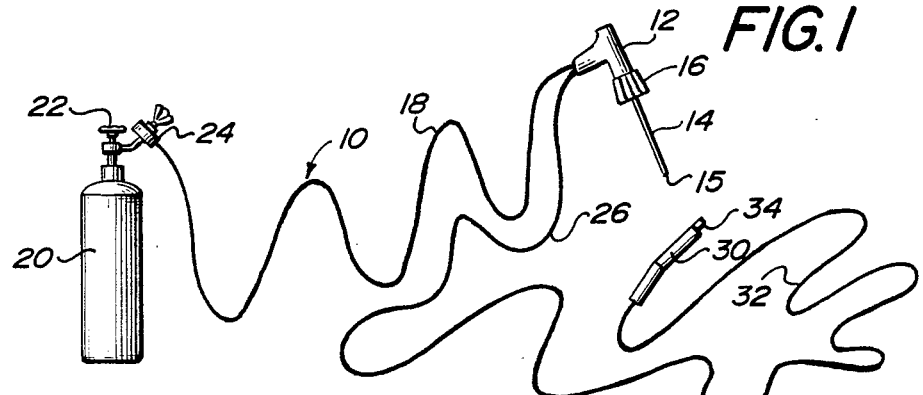
FIG. 1 is a schematic representation of a system according to the present invention.

Torch 12 includes a flexible hose 18 which is connected to a source of oxidizing gas (e.g. commercially pure oxygen) contained in a standard oxygen cylinder 20. Oxygen cylinder 20 includes the necessary cylinder valve 22 and regulator 24 to control the flow of oxygen to the torch 12 and thence to electrode 14. An electrical conduit 26 is included in torch 12 to conduct electricity from a source of electricity such as storage battery 28 to the torch 12 and to the electrode 14. In order to complete the circuit, one terminal of the battery 28 can be connected directly to the workpiece or if the work is not metallic, a striker 30 such as shown in U.S. Patent Application 636,523 filed Aug. 1, 1984 relating to a design for a Striker For Exothermic Cutting Electrodes. Striker 30 includes an electrical conduit 32 connected to the source of current 28. When the torch 12 and striker 30 are connected to the storage battery 28 and electrode 14 is in place, rubbing the electrode 14 across the exposed conductor 34 of striker 30 will cause an arc to be established. Oxygen flowing through the electrode will then cause combustion, thus producing a flame at the tip 15 of electrode 14 which can be directed against a workpiece to be cut.

Figure 2:
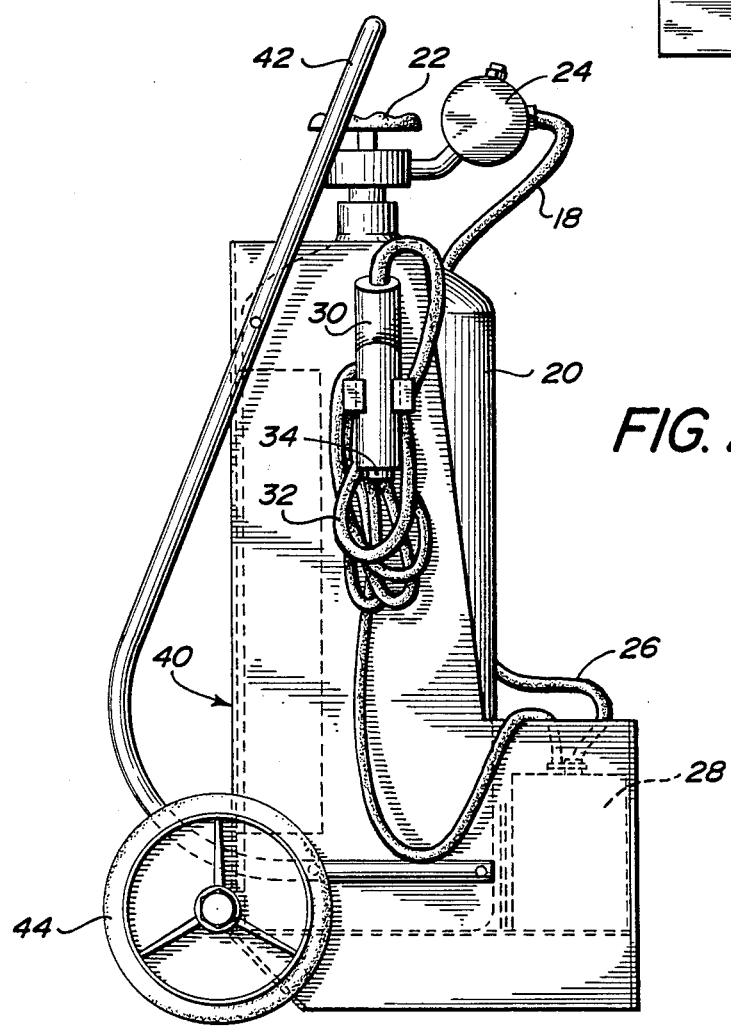
FIG. 2 is a right side elevational view of a portable system according to the present invention.

As shown in FIG. 2, the system can include a wheeled cart 40 with a handle 42 and wheels 44, 46 so that the cylinder 20, the torch 12 storage battery 28 oxgen hose 18 and electrical conduits 26 and 32 are all held in a single apparatus ready for use. In an emergency situation, the cart 40 need only be wheeled to the point of use of the torch 12 and striker 30 removed, an arc initiated, oxygen flow started and the system is ready to used to cut away metal or other structural debris to free a trapped accident victim. In addition, the device can be moved about a metal reclamation operation such as an automobile scrapyard to cut apart automobile bodies at remote locations. In addition to the foregoing, the potential uses are numerous for a portable device that only requires a small cylinder of oxygen 20 without the need for a source of fuel and/or a large welding power supply.

FIG. 4 shows an unwheeled portable stand 50 having a base 52 ends 54, 56 which can be made by bending a piece of flat sheet steel and angle support 58. A cylinder caddy 60 is disposed between the ends 56, 54 and welded thereto. Cylinder caddy 60 includes a bracket or strap 62 so that a cylinder of oxygen can be readily affixed to the caddy 60. Strap 62 includes handle 64 so the entire apparatus can be conveniently carried from one location to another. The source of electrical current such as a storage battery can be disposed in a battery box 66 and the torch striker hose and electrical conduits can be disposed in the space under the caddy 60 making a neat readily portable unit. As stated before, a device according to the present invention would be ideal for emergency rescue operations where a flame could be produced with very little set up to extricate a trapped victim.

Having thus described our invention what is desired to secured by Letters Patent of the United States is set forth in the appended claims:

1. A self-contained system for exothermic cutting comprising in combination:

a carrying case;

first means disposed within said case to provide current to a welding electrode;

second means removably disposed with said case to provide a source of oxygen;

a holder for gripping an exothermic electrode said holder including means to grip said exothermic electrode and conduct current and oxygen to said electrode; and a means for providing a completed electrical circuit for striking an arc with said electrode to initiate the exothermic reaction of said electrode.

2. A self contained system according to claim 1 wherein said means to provide current includes a storage battery.

3. A self-contained system according to claim 1 wherein said means to provide oxygen include a high pressure storage bottle and regulator.

4. A system according to claim 1 wherein said means for providing a completed circuit includes a striker plate and electrical conduit to be connected to said means for providing current.

5. A system according to claim 1 wherein there is included a hose for conducting oxygen from said second means to said holder and an electrical conduit for conducting current to said holder.

* * * * *